Patented Feb. 8, 1938

2,107,318

UNITED STATES PATENT OFFICE 2,107,318

WHITE COATING ON ALUMINUM

Harold K. Work, Oakmont, and Martin Tosterud, Arnold, Pa., assignors to Aluminum Company of America, Pittsburgh, Pa., a corporation of Pennsylvania No Drawing. Application August 15, 1934, Serial No. 739,928

6 Claims. (Cl. 204—1)

This invention relates to the treatment of aluminum surfaces to produce thereon opaque white oxide coatings, and it is particularly concerned with the production of white coatings which are resistant to staining.

Methods have heretofore been described for the treatment of aluminum surfaces to produce so-called white coatings on them. However, in most cases the surfaces obtained, rather than having the opaque milky white color of a pigmented surface, possess the silvery white appearance of a cleaned metallic surface. One of the most satisfactory methods for obtaining a dense white color resembling a pigmented coating on aluminum surfaces is that described by Martin Tosterud in U. S. Patent No. 1,946,150, in which an oxide coating is treated with a solution of an acid having a solvent action on the colored constituents of the oxide coating. The white coatings so produced are, however, more or less porous and adsorbent and are consequently subject to staining and discoloration on handling and exposure. Furthermore, these coatings cannot be readily cleaned by simple washing. The scope of applicability of these coatings is therefore somewhat limited.

It is a primary object of this invention to produce aluminum articles provided with light-diffusing, opaque oxide coatings which have a milky white color, which are substantially resistant to staining and discoloration on exposure and handling, and which are readily cleanable by simple washing. It is more particularly an object of this invention to provide a method for the treatment of aluminum surfaces to produce opaque, milky white oxide coatings thereon which are substantially impervious and non-adsorbent.

The term "aluminum" as used herein and in the appended claims includes both the metal aluminum and aluminum base alloys. The term "oxide coating" includes such coatings generally so designated in the art consisting in substantial part of aluminum oxide and formed integral with the aluminum surface by artificial oxidation of the surface, such as by electrolytic oxidation.

The oxide coatings produced on aluminum surfaces by the usual methods of electrolytic oxidation are substantially porous and adsorbent and are more or less colored by impurities and constituents other than aluminum present in and on the aluminum surfaces originally treated. These oxide coatings are treated according to the method of the present invention by converting them to an opaque, light-diffusing form having a milky white color and simultaneously rendering them substantially non-porous and non-adsorbent.

In accomplishing this dual result the aluminum surface provided with a suitable oxide coating is treated with a solution of a salt of a metal such as aluminum and a strong mineral acid, such as nitric, hydrochloric or sulfuric acid, at a temperature above about 80° C. This treatment is carried out preferably by contacting the oxide-coated aluminum article with a solution containing about 1 to 10 per cent of aluminum sulfate, aluminum nitrate or aluminum chloride, by immersion or other suitable means. With such solutions the desired conversion of the oxide coating to a non-adsorbent, opaque form having a milky white color may be obtained by treatment for about 5 to 60 minutes at a temperature above 80° C. and preferably at a boiling temperature. The concentration of the aluminum salt solution and the time of treatment are, however, not limited to the specific ranges recited, as satisfactory non-adsorbent, milky white coatings may be obtained with more concentrated solutions and shorter periods of treatment.

Most satisfactory results are obtainable by the treatment of oxide coatings produced on substantially pure aluminum surfaces. Such coatings have a denser, whiter color after treatment in the hot aluminum salt solution. A commercial grade of aluminum containing not more than about 1 per cent of impurities gives very good results. In general the presence of small amounts of the usual alloying elements does not prevent the obtaining of satisfactory results, but larger amounts of some elements, such as silicon, manganese and sometimes copper, when present in the aluminum alloy treated, may impart to the oxide coating an amount of color depending upon the amount of the elements present, which color may remain in the coating in some degree after treatment according to this invention. Other alloying elements, for example magnesium and zinc, do not color the oxide coating even when present in relatively large amount.

Suitable oxide coatings for the purposes of this invention may be produced on an aluminum surface by electrolytic oxidation, for example in a solution of sulfuric acid or oxalic acid or a mixture of these acids. When sulfuric acid solution electrolytes are used, the concentration of the solution may range from about 1 to 70 per cent acid. The aluminum article to be coated is made the anode in such electrolyte when direct current is used; or when alternating current is applied, aluminum articles to be oxide-coated may be used for both electrodes in the cell. The current density, temperature, and time of treatment are suitably adjusted with the particular concentration of acid used to produce on the aluminum surface an oxide coating of substantial thickness which is relatively hard. For example, when a 15 per cent solution of sulfuric acid is used, a satisfactory oxide coating may be obtained by treatment at a current density of about 12 amperes per square foot for 30 minutes at a temperature of about 75 to 85° F. When aqueous solutions of oxalic acid are used, satisfactory results may be obtained with electrolytes containing about 1 to 10 per cent, and electrolytes containing 3 to 7 per cent have proved most satisfactory.

In the preferred practice of this invention the non-adsorbent, opaque, milky white coatings on aluminum are obtained as follows: An aluminum article is made the anode in an electrolytic cell containing a 15 per cent solution of sulfuric acid. Direct current having a current density of about 12 amperes per square foot is applied to the cell for a period of 30 minutes while the electrolyte is maintained at a temperature of about 75° F. The oxide-coated article so obtained is then washed and immersed in a boiling 5 per cent solution of aluminum nitrate for about 5 minutes. There is produced by this treatment an aluminum article having an opaque, milky white coating which is substantially non-porous and non-adsorbent and which may be washed to remove surface discoloration by any ordinary means.

Having now particularly described the method of this invention and the improved article produced thereby, we claim:

1. A method of producing an opaque oxide coating having a milky white color substantially resistant to permanent staining by adsorption on an aluminum surface, comprising forming an oxide coating on said surface by electrolytic oxidation in an electrolyte of the class consisting of aqueous solutions of sulfuric acid and oxalic acid, and thereafter simultaneously removing colored constituents from said oxide coating and rendering the oxide coating substantially non-porous and non-adsorbent by subjecting said oxide coating to treatment with a solution of an aluminum salt of a strong mineral acid at a temperature above about 80° C.

2. A method of producing an opaque oxide coating having a milky white color substantially resistant to permanent staining by adsorption on an aluminum surface, comprising forming an oxide coating on said surface by electrolytic oxidation in an electrolyte of the class consisting of aqueous solutions of sulfuric acid and oxalic acid, and thereafter simultaneously removing colored constituents from said oxide coating and rendering the oxide coating substantially non-porous and non-adsorbent by subjecting said oxide coating to treatment with a solution containing about 1 to 10 per cent of an aluminum salt of a strong mineral acid at a temperature above about 80° C.

3. A method of producing an opaque oxide coating having a milky white color substantially resistant to permanent staining by adsorption on an aluminum surface, comprising forming an oxide coating on said surface by electrolytic oxidation in an electrolyte of the class consisting of aqueous solutions of sulfuric acid and oxalic acid, and thereafter simultaneously removing colored constituents from said oxide coating and rendering the oxide coating substantially non-porous and non-adsorbent by subjecting said coating to treatment with a boiling solution containing 1 to 10 per cent of an aluminum salt of a strong mineral acid.

4. A method of producing an opaque oxide coating having a milky white color substantially resistant to permanent staining by adsorption on an aluminum surface, comprising forming an oxide coating on said surface by electrolytic oxidation in an electrolyte of the class consisting of aqueous solutions of sulfuric acid and oxalic acid, and thereafter simultaneously removing colored constituents from said oxide coating and rendering the oxide coating substantially non-porous and non-adsorbent by subjecting said coating to treatment with a boiling solution containing 1 to 10 per cent of aluminum nitrate.

5. A method of producing an opaque oxide coating having a milky white color substantially resistant to permanent staining by adsorption on an aluminum surface, comprising forming an oxide coating on said surface by electrolytic oxidation in an electrolyte of the class consisting of aqueous solutions of sulfuric acid and oxalic acid, and thereafter simultaneously removing colored constituents from said oxide coating and rendering the oxide coating substantially non-porous and non-adsorbent by subjecting said coating to treatment with a boiling solution containing 1 to 10 per cent of aluminum sulfate.

6. A method of producing an opaque oxide coating having a milky white color substantially resistant to permanent staining by adsorption on an aluminum surface, comprising forming an oxide coating on said surface by electrolytic oxidation in an electrolyte of the class consisting of aqueous solutions of sulfuric acid and oxalic acid, and thereafter simultaneously removing colored constituents from said oxide coating and rendering the oxide coating substantially non-porous and non-adsorbent by subjecting said coating to treatment with a boiling solution containing 1 to 10 per cent of aluminum chloride.

HAROLD K. WORK.
MARTIN TOSTERUD.